(12) United States Patent
Katan et al.

(10) Patent No.: US 10,831,473 B2
(45) Date of Patent: Nov. 10, 2020

(54) LOCATING BUSINESS RULES IN APPLICATION SOURCE CODE

(71) Applicant: International Business Machines Corporation, Armonk, NY (US)

(72) Inventors: Rami Katan, Petach-Tikva (IL); Michael J. A. Johnson, Awbridge (GB); William Alexander, North Kingstown, RI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/592,434

(22) Filed: Oct. 3, 2019

(65) Prior Publication Data

US 2020/0097285 A1   Mar. 26, 2020

Related U.S. Application Data

(63) Continuation of application No. 16/139,207, filed on Sep. 24, 2018, now Pat. No. 10,489,151.

(51) Int. Cl.
*G06F 8/75* (2018.01)
*G06F 8/77* (2018.01)
(Continued)

(52) U.S. Cl.
CPC ............... *G06F 8/75* (2013.01); *G06F 8/72* (2013.01); *G06F 8/73* (2013.01); *G06Q 10/067* (2013.01)

(58) Field of Classification Search
None
See application file for complete search history.

(56) References Cited

U.S. PATENT DOCUMENTS 6,389,588 B1 * 5/2002 Wadhwa ............... G06F 8/74
717/106
9,588,871 B1 * 3/2017 Estes, Jr. .............. G06F 8/73
(Continued)

OTHER PUBLICATIONS

UniqueSoft LLC, "Business Rules Extracted from Code," Version 2.2, www.uniquesoft.com, Sep. 27, 2017, pp. 1-10.
(Continued)

*Primary Examiner* — Philip Wang
(74) *Attorney, Agent, or Firm* — Robert A. Voigt, Jr.; Winstead PC

(57) ABSTRACT

A method, system and computer program product for locating business rules in application source code. Static code analysis is performed on the application source code to collect variable usage and statement information, which is stored in a repository. Variables that are used in conditions and computational statements are identified using the stored information, including determining the usage distribution of these variables in such conditions and computational statements and whether such conditions and computational statements are within copybooks. A score is assigned to these identified variables based on usage and if their usage is shared in copybooks. Those variables with a score exceeding a threshold value are selected to be inserted in a list of business terms. Usage locations of the variables in the list are extracted. The business rules in the application source code containing the logic using these variables are then identified based on the extracted usage locations.

20 Claims, 5 Drawing Sheets

(51) Int. Cl.
G06F 8/72 (2018.01)
G06Q 10/06 (2012.01)
G06F 8/73 (2018.01)

(56) References Cited

U.S. PATENT DOCUMENTS

| | | | | |
|---|---|---|---|---|
| 2005/0235266 A1* | 10/2005 | Oara | ............... | G06F 8/74 |
| | | | | 717/126 |
| 2006/0241961 A1* | 10/2006 | Tsyganskiy | ............... | G06F 8/72 |
| | | | | 717/104 |
| 2015/0142718 A1* | 5/2015 | Bostick | ............... | G06N 5/025 |
| | | | | 706/47 |
| 2015/0268955 A1* | 9/2015 | Mehalingam | ............... | G06F 8/74 |
| | | | | 717/123 |
| 2015/0347129 A1* | 12/2015 | Chittimalli | ............... | G06F 8/73 |
| | | | | 717/123 |
| 2017/0192777 A1* | 7/2017 | Apte | ............... | G06F 8/427 |

OTHER PUBLICATIONS

List of IBM Patents or Patent Applications Treated as Related, Oct. 7, 2019, pp. 1-2.

\* cited by examiner

FIG. 4

| VARIABLE NAME | # TIMES USED IN CONDITIONS | # TIMES USED IN COMPUTATIONAL STATEMENTS |
|---|---|---|
| POLICY-ID | 187 | 0 |
| INTEREST-RATE | 48 | 35 |
| CLAIM-HISTORY | 80 | 12 |
| CUST-AGE | 56 | 17 |
| RISK-SCORE | 61 | 23 |
| ... | ... | ... |

FIG. 5

| TYPE | SOURCE (LINE) |
|---|---|
| IF | PGM00034(345) |
| IF | PGM00034(1058) |
| EVALUATE | COPY0445(56) |
| COMPUTE | PGM00792(2340) |
| ... | ... |

FIG. 6

```
IF POLICY-ID = 544 AND CUST-AGE < 40
AND FEMALE THEN
PREMIUM -DISCOUNT = 20
END-IF
```

LOCATING BUSINESS RULES IN APPLICATION SOURCE CODE

TECHNICAL FIELD

The present invention relates generally to application coding, and more particularly to locating business rules in application source code.

BACKGROUND

An application software (app or application for short) is computer software designed to perform a group of coordinated functions, tasks, or activities for the benefit of the user. Various applications may include what is referred to as "business logic." Business logic is the part of the program that encodes the real-world business rules that determine how data can be created, stored and changed. This is contrasted with the remainder of the software that might be concerned with lower-level details, such as managing a database or displaying the user interface, system infrastructure or generally connecting various parts of the program.

Oftentimes though, such business logic needs to be changed in the program. For example, the business logic may need to be changed due to regulatory changes, modernization, simplification, exposure to audit, business needs, etc.

However, such business logic may be buried in the application source code thereby making it difficult to locate. Furthermore, the business logic may be written in a particular programming language within a monolithic application thereby making it difficult to change the business logic as rapidly as might be required.

Legacy applications tend to be big, in the volumes of millions of lines of code and thousands of programs, and are usually not documented up-to-date. Maintenance of these applications is usually done by teams who did not write the original application, be it internal teams or outsourced teams. As a result, identifying the business rules implemented in these applications is a challenge.

There have many attempts to expose the business logic as business rules; however, such attempts have been deficient. While there are tools that are used to analyze the composition of an application, such tools do not have a reliable way of identifying the business rules within the application.

SUMMARY

In one embodiment of the present invention, a method for locating business rules in application source code comprises performing a static code analysis on the application source code to collect variable usage and statement information. The method further comprises identifying variables used in conditions and computational statements in the application source code using the collected variable usage and statement information. The method additionally comprises determining amount of usage of the identified variables in the conditions and computational statements using the collected variable usage and statement information. Furthermore, the method comprises assigning a score to the identified variables based on usage and if their usage is shared in copybooks. Additionally, the method comprises selecting variables with a score exceeding a threshold value to be placed in a list of business terms. In addition, the method comprises extracting usage locations of variables in the list of business terms from the collected variable usage and statement information. The method further comprises identifying business rules in the application source code corresponding to logic using one or more of the variables in the list of business terms based on the extracted usage locations.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 4 illustrates a list of variables that are defined in copybooks that are used in conditions and computational statements in accordance with an embodiment of the present invention;

FIG. 5 illustrates identifying the locations of the conditions and computational statements in the application source code that are using a particular variable from the list of variables shown in FIG. 4 in accordance with an embodiment of the present invention; and FIG. 6 illustrates visiting the source of the condition or computational statement to verify that the variable used by the condition/computational statement is a valid business term in accordance with an embodiment of the present invention.

DETAILED DESCRIPTION

Figure 1:
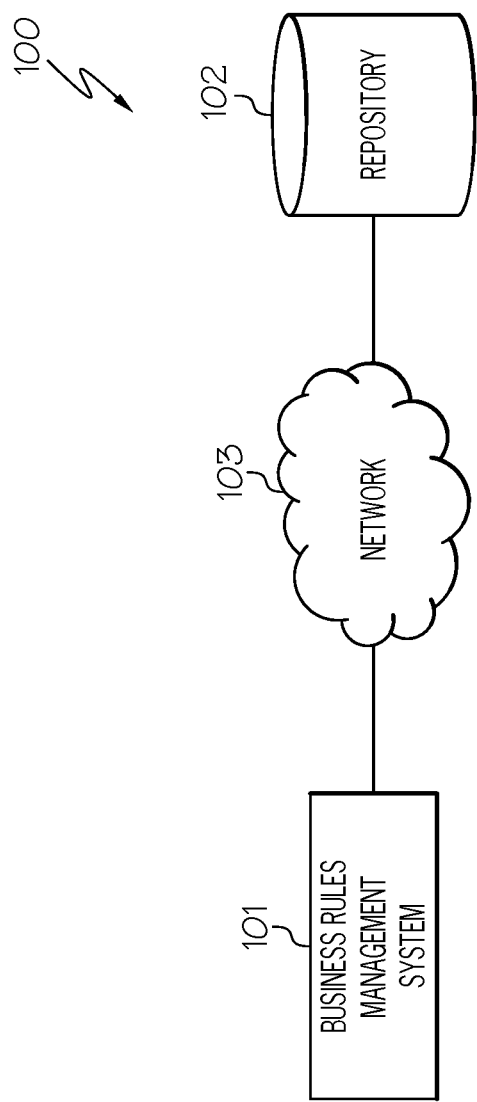
FIG. 1 illustrates a system for practicing the principles of the present invention in accordance with an embodiment of the present invention.

As discussed herein, embodiments of the present invention provide the automatic discovery of the key variables and records in an application based on the statistics of its usage and user defined weights. The approach allows "bottom up discovery" that suggests the business terms and business rules back to the technical people instead of having them looking at it top-bottom (e.g., seeking logic flow in a defined program). In one embodiment, when looking for business rules in the source code of one or more applications, the starting point may be the many sources of the business rules as an input. The usage statistics of the variables and the scored variables (discussed further below) are aggregated from the statements of every program, hence bottom-up. As a result, the approach starts with all the sources of business rules and focuses on specific programs and specific code areas as a result of the present invention.

Consequently, the embodiments of the present invention provide a way for the technical people to be advised to look for specific business logic in recommended programs and lines of code that highly match the business rules they seek with a low false-positive rate. The automatic identification of the key records and variables of the application leads to building a catalog of the business terms and allows a team of people to discover and map business rules in a very efficient way. Furthermore, embodiments of the present invention allow locating logic using several variables together leading to easily identifying specific logic within applications with millions of lines of code. This is very effective for organizations seeking application modernization and doing so with either internal teams or external solution providers who have millions of lines of code to review with no updated documentation and low-level knowledge of the applications.

Additionally, embodiments of the present invention involve an automation flow from business term discovery (key variables used in the code) to identifying the conditional and calculation logic using them and describing it in a business decision engine (e.g., operational decision manager (ODM) by IBM®), to refactoring the code within an integrated development environment (IDE) to replace the original logic with a call to the business decision (business rule is a statement of logic that is used for a business decision to be made) with the matching input and output data elements. This automation flow is an automatic end-to-end method of refactoring existing applications. In one embodiment, such a process may be performed using the combination of products of application discovery and delivery intelligence (ADDI), ODM and IDz by IBM® using the data on the location of the logic in the source code and the refactoring at the IDE level thereby allowing quick compile and validation of each business decision/business rule.

The present invention comprises a method, system and computer program product for locating business rules in application source code. In one embodiment of the present invention, static code analysis is performed on the application source code to collect variable usage and statement information, which is stored in a repository. Variables used in conditions (e.g., IF conditions, EVALUATE conditions, PERFORM loop conditions, embedded SQL conditions, such as the WHERE clause) and computational statements (e.g., COMPUTE, ADD, SUBTRACT, DIVIDE, MULTIPLY) are identified in the application source code using the collected variable usage and statement information in the repository. Furthermore, the amount of usage of these identified variables in the conditions and computational statements is determined using the collected variable usage and statement information in the repository. Additionally, it is determined whether these conditions and computational statements are used in copybooks ("include files"). A score is then assigned to these identified variables based on usage and if their usage is shared in copybooks. Those variables with a score exceeding a threshold value are selected to be inserted in a list of business terms. Usage locations of the variables in the list of business terms are extracted. By extracting the usage locations of the variables in the list of business terms, the business rules may be easily identified around such usages. The business rules in the application source code implementing the logic using the business term(s) from the list of business terms are identified based on the extracted usage locations of those business term(s). That is, the locations of the business rules in the application source code are identified based on the locations of the business terms in the application source code. For example, the logic using the business terms can be identified based on the extracted usage locations of those business terms. In this manner, business rules can be easily and reliably identified within the application. As a result, when business logic needs to be changed, such as due to regulatory changes, modernization, simplification, exposure to audit, business needs, etc., such business logic will now be more easily identified, and therefore, more easily changed, using the principles of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses embodiments of the present invention using examples and terminology from the COBOL programming language, the principles of the present invention may be applied to any programming language (i.e., the present invention is software language agnostic). A person of ordinary skill in the art would be capable of applying the principles of the present invention to such implementations. Further, embodiments applying the principles of the present invention to such implementations would fall within the scope of the present invention.

Referring now to the Figures in detail, FIG. 1 illustrates an embodiment of the present invention of a system 100 for practicing the principles of the present invention in accordance with an embodiment of the present invention. System 100 includes a business rules management system 101 connected to a repository 102 via a network 103. Business rules management system 101 is configured to locate business rules in the application source code as discussed further below in connection with FIGS. 3A-3B and 4-6. Repository 102 is configured to store the collected variable usage and statement information from the static code analysis that is performed on the application source code. In one embodiment, such information is used by business rules management system 101 to identify variables in the application source code that are likely to be business terms. After extracting usage locations of these business terms from repository 102, business rules management system 101 identifies the business rules in the application source code corresponding to the logic that uses such business terms as discussed further below. A description of the hardware configuration of business rules management system 101 is provided below in connection with FIG. 2.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular architecture. System 100 may include any number of business rules management systems 101 and repositories 102.

Figure 2:
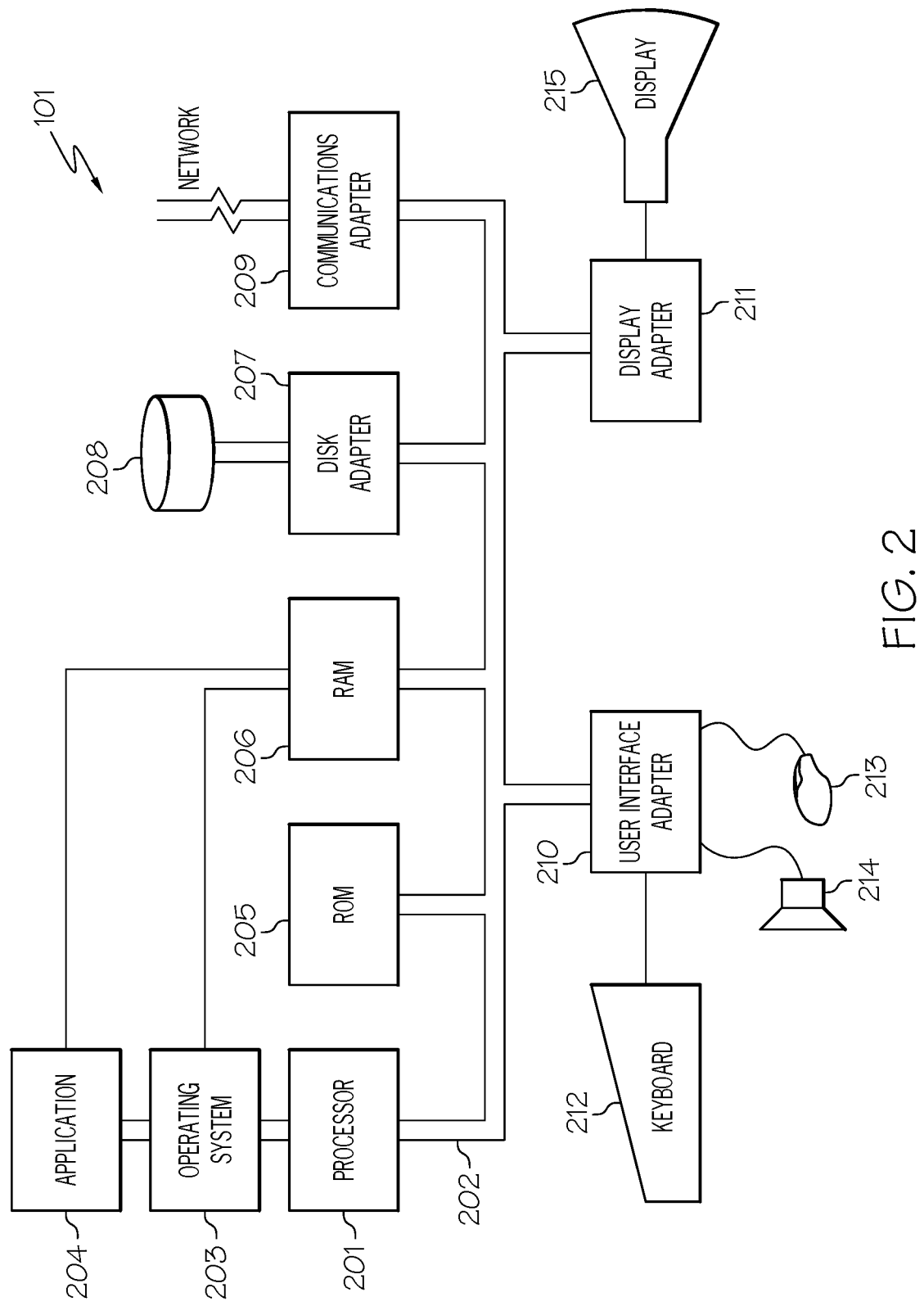
FIG. 2 illustrates an embodiment of the present invention of a hardware configuration of a business rules management system which is representative of a hardware environment for practicing the present invention.

Referring now to FIG. 2, FIG. 2 illustrates a hardware configuration of business rules management system 101 (FIG. 1) which is representative of a hardware environment for practicing the present invention. Referring to FIG. 2 business rules management system 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for locating the business rules in the application source code as discussed further below in connection with FIGS. 3A-3B and 4-6.

Referring again to FIG. 2, read-only memory ("ROM") 205 is coupled to system bus 202 and includes a basic input/output system ("BIOS") that controls certain basic functions of business rules management system 101. Random access memory ("RAM") 206 and disk adapter 207 are also coupled to system bus 202. It should be noted that software components including operating system 203 and application 204 may be loaded into RAM 206, which may be business rules management system's 101 main memory for execution. Disk adapter 207 may be an integrated drive electronics ("IDE") adapter that communicates with a disk unit 208, e.g., disk drive.

Business rules management system 101 may further include a communications adapter 209 coupled to bus 202. Communications adapter 209 interconnects bus 202 with an outside network (e.g., network 103 of FIG. 1) thereby enabling business rules management system 101 to communicate with other devices (e.g., repository 102).

I/O devices may also be connected to business rules management system 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to business rules management system 101 through keyboard 212 or mouse 213 and receiving output from business rules management system 101 via display 215 or speaker 214. Business rules management system 101 of FIG. 2 is not to be limited in scope to the elements depicted in FIG. 2 and may include fewer or additional elements than depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, various applications may include what is referred to as "business logic." Business logic is the part of the program that encodes the real-world business rules that determine how data can be created, stored and changed. This is contrasted with the remainder of the software that might be concerned with lower-level details, such as managing a database or displaying the user interface, system infrastructure or generally connecting various parts of the program. Oftentimes though, such business logic needs to be changed in the program. For example, the business logic may need to be changed due to regulatory changes, modernization, simplification, exposure to audit, business needs, etc. However, such business logic may be buried in the application source code thereby making it difficult to locate. Furthermore, the business logic may be written in a particular programming language within a monolithic application thereby making it difficult to change the business logic as rapidly as might be required. There have many attempts to expose this business logic as business rules; however, such attempts have been deficient. While there are tools that are used to analyze the composition of an application, such tools do not have a reliable way of identifying the business rules within the application.

Figure 3A:
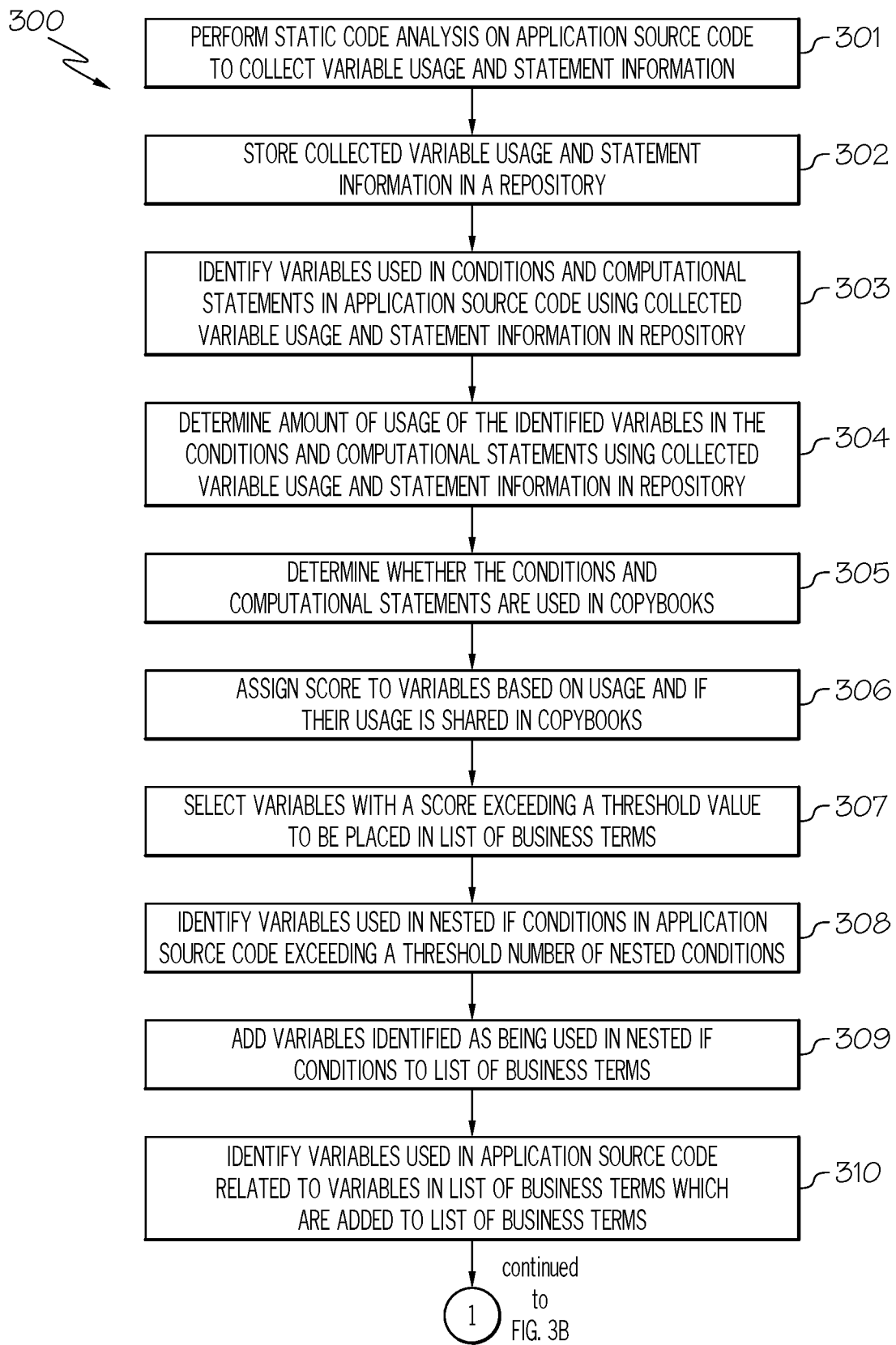
FIGS. 3A-3B are a flowchart of a method for locating business rules in the application source code in accordance with an embodiment of the present invention.
Figure 3B:
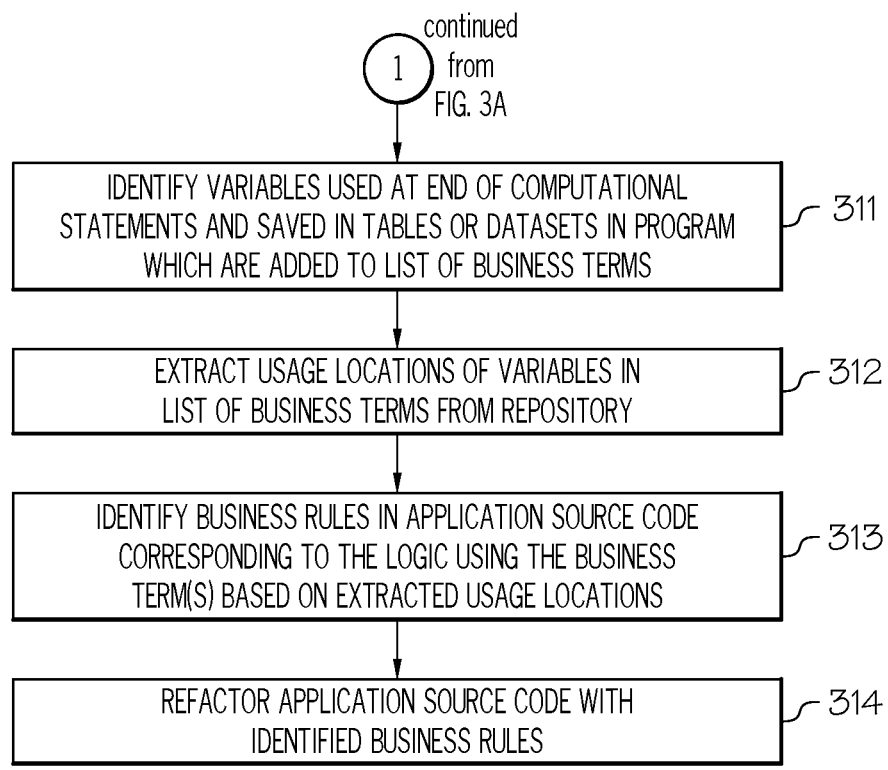

The embodiments of the present invention provide a means for reliably identifying the business rules within the application by identifying variables within the application source code that are likely to be business terms and then extracting usage locations of these variables to identify the business rules with corresponding logic that utilizes these business terms as discussed below in connection with FIGS. 3A-3B and 4-6. FIGS. 3A-3B are a flowchart of a method for locating business rules in the application source code. FIG. 4 illustrates a list of variables that are defined in copybooks that are used in conditions and computational statements. FIG. 5 illustrates identifying the locations of the conditions and computational statements in the application source code that are using a particular variable from the list of variables shown in FIG. 4. FIG. 6 illustrates visiting the source of the condition or computational statement to verify that the variable used by the condition/computational statement is a valid business term.

As stated above, FIGS. 3A-3B are a flowchart of a method 300 for locating business rules in the application source code in accordance with an embodiment of the present invention.

Referring to FIG. 3A, in conjunction with FIGS. 1-2, in step 301, business rules management system 101 performs static code analysis on the application source code to collect variable usage and statement information. In one embodiment, such an analysis is performed using ADDI by IBM®. "Variable usage and statement information," as used herein, refers to information concerning the use of variables in the source code as well as the use of statements (syntactic units of the programming language that express some action to be carried out) in the source code. Furthermore, variable usage and statement information includes usage locations of the variables in the source code. In one embodiment, such analysis is used to show program call graphs, resource usage and cross reference reports.

In step 302, business rules management system 101 stores the collected variable usage and statement information in repository 102.

In step 303, business rules management system 101 identifies the variables used in conditions (e.g., IF conditions, EVALUATE conditions, PERFORM loop conditions, embedded SQL conditions, such as the WHERE clause) and computational statements (e.g., COMPUTE, ADD, SUBTRACT, DIVIDE, MULTIPLY) in the application source code using the collected variable usage and statement information in repository 102. Such variables that are used in conditions and computational statements are more likely to be used as business terms. That is, such variables are more likely to be instrumental for the application business logic. As a result, business rules management system 101 identifies such variables in conditions and computational statements.

In step 304, business rules management system 101 determines the amount of usage of the identified variables in the conditions and computational statements using the collected variable usage and statement information in repository 102. For example, business rules management system 101 determines how many times a particular variable is used in various conditions (e.g., IF conditions) and computational statements (e.g., ADD).

In step 305, business rules management system 101 determines whether the conditions and computational statements (see steps 303 and 304) are used in copybooks (commonly referred to as "include files"). Many programming languages and other computer files have a directive, often called "include" (as well as copy and import), that causes the contents of a second file to be inserted into the original file. These included files are called "copybooks." They are often used to define the physical layout of program data, pieces of procedural code and/or forward declarations while promoting encapsulation and the reuse of code. Variables that are used in copybooks are shared between programs, and therefore, are more likely to be business terms. That is, variables that are used in copybooks may correspond to sharable data structures that many programs use. Such variables are more likely to be instrumental for the application business logic. As a result, business rules management system 101 determines whether the conditions and conditional statements discussed in steps 303, 304 are used in copybooks.

For example, the following two variables, variable 1 and variable 2, have been identified in various conditions, computational statements and in copybooks. As illustrated below, the total usage, and the distribution of such usage among conditions and computational statements, and whether such conditions and computational statements appear in copybooks, is identified by business rules management system 101.

Variable 1—Total of 350 usages with the following distribution:
  310 in IF conditions, out of which 20 in copybooks;
  20 in EVALUATE conditions, none in copybooks;
  20 in computational statements, 10 of which in copybooks.

Variable 2—Total of 300 usages with the following distribution:
  150 in IF conditions, out of which 100 in copybooks;
  50 in Loop conditions, none in copybooks;
  50 in computational statements, 40 of which in copybooks;
  50 in SQL conditions, 20 of which in copybooks.

In one embodiment, such information may be obtained via an application programming interface (API). For example, the API may run a set of queries that return the usage statistics of variables and records from copybooks in the application programs. Since copybooks can be shared between many applications, the result is the summary of all usages in all applications.

Furthermore, the API can identify the top used variables defined in programs to cover the cases where monolithic programs handle very complex business logic which is not shared with other programs.

Alternatively, in one embodiment, such information may be obtained using a business decision engine, such as operational decision manager (ODM) by IBM®.

In one embodiment, the result of running such queries is a file (e.g., JavaScript Object Notation (JSON) file) listing the top variables used in conditions and computational statements with a breakdown of the statements they are used in. For COBOL language for instance, the query will return the number of usages in IF conditions, EVALUATE conditions, PERFORM loop conditions, and embedded SQL conditions (WHERE clause). The computational statements (COMPUTE, ADD, SUBTRACT, DIVIDE, MULTIPLY) can be collected together or separately. The returned list can be sorted by usage counts or the file names and variable names can be sorted alphabetically.

Furthermore, detailed variable usage may be obtained via an API. For example, the API may receive as input the variable name, source definition and line, and return all usages in the programs and copybooks indicating the source member and source line. Such information may be used to obtain fast access to the usages and help locate the business rules with easy browsing filtering by condition/computational statement type. Since the statements in copybooks are included in every program using the copybook file, the program names are also provided by the API for possible filtering and presentational information.

The variable access type (whether the variable is being read or written directly or indirectly) may also be provided.

A further example of identifying variables as defined in copybooks that are also used in conditions and computational statements is shown in FIG. 4. FIG. 4 illustrates a list of variables that are defined in copybooks that are used in conditions and computational statements in accordance with an embodiment of the present invention. In one embodiment, such a list is the form of a table (table 400) generated by business rules management system 101.

As shown in FIG. 4, table 400 includes a listing of variable names 401 that are defined in copybooks that are used in conditions and computational statements as well as indicates the number of times such variables are used in conditions 402 as well as the number of times used in computational statements 403.

In one embodiment, the location of the condition or conditional statement in the application source code that uses a variable in table 400 is identified by business rules management system 101 as discussed below in connection with FIG. 5. FIG. 5 illustrates identifying the locations of the conditions and computational statements in the application source code that are using a particular variable from the list of variables shown in FIG. 4 in accordance with an embodiment of the present invention. In one embodiment, such information is presented in the form of a table (table 500) generated by business rules management system 101.

Referring to FIG. 5 in conjunction with FIG. 4, for the variable CUST-AGE as shown in FIG. 4, table 500 lists the types 501 of conditions/computational statements that use such a variable as well as the source of the condition/computational statement in the application source code, such as by identifying the line 502 in the source code where such a condition/computational statement appears.

In one embodiment, a user may visit the source of the variable to determine whether the variable is a valid business term as shown in FIG. 6.

FIG. 6 illustrates visiting the source of the condition or computational statement to verify that the variable used by the condition/computational statement is a valid business term in accordance with an embodiment of the present invention.

For example, referring to FIGS. 5 and 6, the user may visit line 345 of the source code to determine if the variable CUST-AGE used in the IF condition is a valid business term. Such decisions by the user may be used to fine-tune the listing of variables that are believed to be valid business terms as discussed further below.

Returning to FIG. 3A, in conjunction with FIGS. 1-2 and 4-6, in step 306, business rules management system 101 assigns a score to the identified variables (identified in step 303) based on usage and if their usage is shared in copybooks.

For example, in one embodiment, weights may be assigned to various usages, including assigning different weights to usages in copybooks. For example, various weights may be assigned to different conditions (e.g., IF conditions, EVALUATE conditions) and computational statements (e.g., COMPUTE, ADD). For instance, a weight of 0.1 may be assigned to IF conditions; whereas, a weight of 0.3 may be assigned to EVALUATE conditions. In another example, a weight of 0.3 may be assigned to COMPUTE computational statements; whereas, a weight of 0.2 may be assigned to ADD computational statements.

In another example, a higher weight may be assigned to usage in copybooks (e.g., a weight of 0.6) since the use of variables in conditions or computational statements in copybooks may indicate a more likely usage of the variable as a business term thereby more likely identifying the use of a business rule in the application source code.

In one embodiment, such weightings are user-specified.

In one embodiment, a score is generated based on the usage, including within the copybook (number of times the variable is used in the particular condition/computational statement) along with the weights assigned to the particular condition/computational statement, including within the copybook. For instance, in the example discussed above, Variable 1 has a total of 350 usages with the following distribution:
- 310 in IF conditions, out of which 20 in copybooks;
- 20 in EVALUATE conditions, none in copybooks;
- 20 in computational statements, 10 of which in copybooks.

If IF conditions are assigned a weight of 0.1, and a weight of 0.5 if such statements are used in copybooks; and if EVALUATE conditions are assigned a weight of 0.3, and a weight of 0.7 if such statements are used in copybooks; and if computational statements are assigned a weight of 0.4, and a weight of 0.8 if such statements are used in copybooks, then Variable 1 with its 350 usages would be assigned the score of (310*0.1+20*0.5+20*0.3+20*0.4+10*0.8) of 63.

The principles of the present invention are not to be limited in scope to such exemplary examples of assigning a score to the identified variables. Variables may be assigned a score based on user preferences applied with the weights.

In step 307, business rules management system 101 selects the variables with a score exceeding a threshold value to be placed in a list, referred to herein as the "list of business terms." Variables that exceed a threshold value are deemed to likely be a business term and such terms are placed in the list of business terms. In one embodiment, the threshold value is user-specified and may be adjusted by the user based on how accurate previously selected variables were valid business terms. As previously discussed, in one embodiment, the user can verify that the variable is a valid business term by visiting the source of the condition/computational statement using that variable as discussed above in connection with FIGS. 5 and 6.

In step 308, business rules management system 101 identifies variables that are used in nested IF conditions in the application source code exceeding a threshold number of nested conditions. In one embodiment, such an analysis is performed using ADDI by IBM®. A nested IF condition is an IF statement that is the target of another IF statement. Nested IF conditions refers to an IF statement inside another IF statement. In certain situations, nested IF conditions hold the business logic and data validations of the more complex business rules. As a result, variables used in such nested IF conditions may correspond to business terms.

In step 309, business rules management system 101 adds the variables that were identified as being used in the nested IF conditions to the list of business terms.

In one embodiment, an API may be used to identify the top variables in nested IF conditions. For example, the API may accept a threshold for the number of nested conditions and provide the variables that are used in nesting levels exceeding the threshold.

In step 310, business rules management system 101 identifies the variables used in the application source code related to the variables in the list of business terms and adds such identified variables to the list of business terms. For example, variables that are tightly connected to the variables used in the conditions or computational statements may be identified as being possibly a business term and added to the list of business terms. For instance, business rules management system 101 identifies variables used in the application source code as being related to variables in the list of business terms based on appearing in conditions with the variable(s) in the list of business terms a threshold number of times. For instance, business rules management system 101 may discover variables related to the variable OWNER-CLAIM-HISTORY-SCORE, such as OWNER-ACCIDENT-COUNT, OWNER-LICENSE-DATE, OWNER-NUMBER-OF CLAIMS, OWNER-FRAUD-ATTEMPT-SCORE, etc. These variables may not be used much in the source code but are part of the business rule related to OWNER-CLAIM-HISTORY-SCORE.

In one embodiment, an API may be used to identify such related variables. For example, an API may be used to obtain the top related variables. For instance, the API call may receive as a parameter a unique indication for the variable using the variable name, definition path and definition line, and return the top variables used together with that variable in conditions and computational statements.

Referring to FIG. 3B, in conjunction with FIGS. 1-2 and 4-6, in step 311, business rules management system 101 identifies the variables used at the end of the computational statements and saved in tables or datasets in the program and adds such identified variables to the list of business terms. Such variables are likely business terms computed by the application and central to the business logic since they were saved for further use. In one embodiment, the number of programs using these tables or datasets can be checked to obtain a better indication for the criticality of these variables. If such variables are defined in copybooks, then such variables are highly likely to be business terms.

In step 312, business rules management system 101 extracts the usage locations of the variables in the list of business terms from repository 102. By extracting the usage locations of the variables in the list of business terms, the business rules may be easily identified around such usages. In one embodiment, the extracted usage locations may be supplied via an API or via an interactive report with hyperlinks to the code lines.

In step 313, business rules management system 101 identifies the business rules in the application source code corresponding to the logic using the business term(s) from the list of business terms based on the extracted usage locations. That is, business rules management system 101 is able to identify the location of the business rules in the application source code based on the location of the business terms in the application source code. For example, the logic using the business terms can be identified based on the extracted usage locations. By locating the business logic, the business rules are identified which utilize such business logic.

In one embodiment, business rules in the application source code may be identified using a copybook of business terms by a business decision engine, such as the operational decision manager (ODM) by IBM®. In such an embodiment, the variables identified as business terms may be used to create a new copybook of business terms, from which a vocabulary is built. The vocabulary is then used to create business rules.

In this manner, business rules can be easily and reliably identified within the application. As previously discussed, business logic is often buried in the application source code thereby making it difficult to locate. Furthermore, the business logic may be written in a particular programming language within a monolithic application thereby making it difficult to change the business logic as rapidly as might be required. By being able to reliably identify the business logic in the application source code, the business rules which utilize such business logic can be more accurately identified. As a result, when business logic needs to be changed, such as due to regulatory changes, modernization, simplification, exposure to audit, business needs, etc., such business logic will now be more easily identified, and therefore, more easily changed, using the principles of the present invention.

Furthermore, in this manner, the functionality or capability of computing systems is improved by preventing a team of software engineers from spending time and utilizing computing resources (e.g., processing resources) in attempting to identify the business rules within the application. In the past, teams of software engineers with knowledge of the current applications may be tasked with identifying the variables representing business terms as well as the business logic and validation logic using such business terms. However, medium-sized applications may contain millions of variables defined in them, which may be spread out over thousands of programs and copybooks. As a result, such a task involves the use of an inordinate amount of computing resources in attempting to identify the business rules within the application. By using embodiments of the present invention to identify the business rules within the application, the amount of computing resources being utilized by software developers for identifying the business rules within the application is reduced. As a result, computing resources (e.g., processing resources) are more efficiently utilized.

Furthermore, the present invention improves the technology or technical field involving software development, such as application coding. As discussed above, business logic in the application needs to be changed. For example, the business logic may need to be changed due to regulatory changes, modernization, simplification, exposure to audit, business needs, etc. However, such business logic may be buried in the application source code thereby making it difficult to locate. Furthermore, the business logic may be written in a particular programming language within a monolithic application thereby making it difficult to change the business logic as rapidly as might be required. There have many attempts to expose this business logic as business rules; however, such attempts have been deficient. While there are tools that are used to analyze the composition of an application, such tools do not have a reliable way of identifying the business rules within the application. The present invention improves such technology by identifying variables used in conditions and computational statements, including within copybooks. Those variables that are likely to be deemed to be business terms are selected to be inserted in a list. The usage locations of these variables are extracted and then used to identify the business rules in the application source code containing logic using these business terms. As a result, the business rules can be more easily and reliably identified within the application source code thereby making it easier to change the business logic as rapidly as may be required. Hence, there is an improvement in software development, such as application coding.

In step 314, business rules management system 101 refactors the application source code with the identified business rules, such as within an integrated development environment (IDE) (e.g., IDz by IBM®). Code refactoring is the process of restructuring existing computer code—changing the factoring—without changing its external behavior. Refactoring improves the nonfunctional attributes of the software. Advantages include improved code readability and reduced complexity; these can improve source-code maintainability and create a more expressive internal architecture or object model to improve extensibility.

In one embodiment, the application source code is refactored with a call out to a business rule engine, microservices or a service.

In one embodiment, the application source code is refactored within an IDE to replace the original logic with a call to the business decision (business rule is a statement of logic that is used for a business decision to be made) with the matching input and output data elements. In one embodiment, the application source code is refactored by replacing the logic with calls to the business decision engine (e.g., operational decision manager (ODM) by IBM®) based on the information aggregated by application discovery and delivery intelligence (ADDI) and ODM.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for locating business rules in application source code, the computer program product comprising a computer readable storage medium having program code embodied therewith, the program code comprising the programming instructions for:

performing a static code analysis on said application source code to collect variable usage and statement information;

identifying variables used in conditions and computational statements in said application source code using said collected variable usage and statement information;

determining amount of usage of said identified variables in said conditions and computational statements using said collected variable usage and statement information;

assigning a score to said identified variables based on usage and if their usage is shared in copybooks;

selecting variables with a score exceeding a threshold value to be placed in a list of business terms;

extracting usage locations of variables in said list of business terms from said collected variable usage and statement information; and identifying business rules in said application source code corresponding to logic using one or more of said variables in said list of business terms based on said extracted usage locations.

2. The computer program product as recited in claim 1, wherein said variable usage and statement information comprises usage locations of variables in said application source code.

3. The computer program product as recited in claim 1, wherein said score is based on weights assigned to particular conditions and computational statements, wherein different weights are assigned to different conditions and computational statements.

4. The computer program product as recited in claim 1, wherein the program code further comprises the programming instructions for:

determining whether said conditions and computational statements are used in copybooks.

5. The computer program product as recited in claim 1, wherein the program code further comprises the programming instructions for:

identifying variables used in nested IF conditions in said application source code exceeding a threshold number of nested conditions; and adding said identified variables used in nested IF conditions to said list of business terms.

6. The computer program product as recited in claim 1, wherein the program code further comprises the programming instructions for:

identifying variables used in said application source code related to variables in said list of business terms based on appearing in conditions with one or more variables in said list of business terms a threshold number of times;

adding said identified variables that are related to variables in said list of business terms to said list of business terms.

7. The computer program product as recited in claim 1, wherein the program code further comprises the programming instructions for:

identifying variables used at end of computational statements and saved in tables or datasets;

adding said identified variables used at end of computational statements and saved in tables or datasets to said list of business terms.

8. The computer program product as recited in claim 1, wherein the program code further comprises the programming instructions for:

refactoring said application source code with said identified business rules.

9. The computer program product as recited in claim 1, wherein said usage locations are supplied via an interactive report with hyperlinks to code lines.

10. The computer program product as recited in claim 1, wherein said usage locations are supplied via an application programming interface.

11. A system, comprising:

a memory for storing a computer program for locating business rules in application source code; and a processor connected to the memory, wherein the processor is configured to execute the program instructions of the computer program comprising:

performing a static code analysis on said application source code to collect variable usage and statement information;

identifying variables used in conditions and computational statements in said application source code using said collected variable usage and statement information;

determining amount of usage of said identified variables in said conditions and computational statements using said collected variable usage and statement information;

assigning a score to said identified variables based on usage and if their usage is shared in copybooks;

selecting variables with a score exceeding a threshold value to be placed in a list of business terms;

extracting usage locations of variables in said list of business terms from said collected variable usage and statement information; and identifying business rules in said application source code corresponding to logic using one or more of said variables in said list of business terms based on said extracted usage locations.

12. The system as recited in claim 11, wherein said variable usage and statement information comprises usage locations of variables in said application source code.

13. The system as recited in claim 11, wherein said score is based on weights assigned to particular conditions and computational statements, wherein different weights are assigned to different conditions and computational statements.

14. The system as recited in claim 11, wherein the program instructions of the computer program further comprise:

determining whether said conditions and computational statements are used in copybooks.

15. The system as recited in claim 11, wherein the program instructions of the computer program further comprise:

identifying variables used in nested IF conditions in said application source code exceeding a threshold number of nested conditions; and adding said identified variables used in nested IF conditions to said list of business terms.

16. The system as recited in claim 11, wherein the program instructions of the computer program further comprise:

identifying variables used in said application source code related to variables in said list of business terms based on appearing in conditions with one or more variables in said list of business terms a threshold number of times;

adding said identified variables that are related to variables in said list of business terms to said list of business terms.

17. The system as recited in claim 11, wherein the program instructions of the computer program further comprise:

identifying variables used at end of computational statements and saved in tables or datasets;

adding said identified variables used at end of computational statements and saved in tables or datasets to said list of business terms.

18. The system as recited in claim 11, wherein the program instructions of the computer program further comprise:

refactoring said application source code with said identified business rules.

19. The system as recited in claim 11, wherein said usage locations are supplied via an interactive report with hyperlinks to code lines.

20. The system as recited in claim 11, wherein said usage locations are supplied via an application programming interface.

* * * * *

UNITED STATES PATENT AND TRADEMARK OFFICE
CERTIFICATE OF CORRECTION

PATENT NO. : 10,831,473 B2  
APPLICATION NO. : 16/592434  
DATED : November 10, 2020  
INVENTOR(S) : Rahamim Katan et al.

Page 1 of 1

It is certified that error appears in the above-identified patent and that said Letters Patent is hereby corrected as shown below:

On the Title Page

Item [72], delete the first name of the first inventor "Rami" and insert --Rahamim--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*